US009567222B2

United States Patent
Jung et al.

(10) Patent No.: US 9,567,222 B2
(45) Date of Patent: Feb. 14, 2017

(54) BLENDING IMPROVEMENT CARBON-COMPOSITE HAVING CARBON-NANOTUBE AND ITS CONTINUOUS MANUFACTURING METHOD AND APPARATUS

(75) Inventors: Man Woo Jung, Daejeon (KR); Seong Yun Jeon, Cheongu-si (KR); Seong Cheol Hong, Daejeon (KR); Joo Hee Han, Daejeon (KR); Joo Seok Oh, Daejeon (KR); Jin Seo Lee, Daejeon (KR); Seung Hoe Do, Daejeon (KR)

(73) Assignee: Hanwha Chemical Corporation, Seoul (KR)

( * ) Notice: Subject to any disclaimer, the term of this patent is extended or adjusted under 35 U.S.C. 154(b) by 942 days.

(21) Appl. No.: 13/381,451

(22) PCT Filed: Jun. 30, 2010

(86) PCT No.: PCT/KR2010/004242
§ 371 (c)(1),
(2), (4) Date: Dec. 29, 2011

(87) PCT Pub. No.: WO2011/002222
PCT Pub. Date: Jan. 6, 2011

(65) Prior Publication Data
US 2012/0112134 A1    May 10, 2012

(30) Foreign Application Priority Data

Jun. 30, 2009    (KR) .................. 10-2009-0059129

(51) Int. Cl.
*H01B 1/04*    (2006.01)
*H01B 1/20*    (2006.01)
(Continued)

(52) U.S. Cl.
CPC ............ *C01B 31/0273* (2013.01); *B82Y 30/00* (2013.01); *B82Y 40/00* (2013.01); *C01B 31/0226* (2013.01); *C01B 2202/06* (2013.01); *Y02P 20/544* (2015.11)

(58) Field of Classification Search
CPC ......... H01B 1/04; H01B 1/20; C01B 31/0273; C01B 2202/06; C01B 31/0226; B82Y 30/00; B82Y 40/00
(Continued)

(56) References Cited

U.S. PATENT DOCUMENTS

2005/0064177 A1    3/2005    Lee et al.
2006/0183841 A1    8/2006    Aneja et al.
(Continued)

FOREIGN PATENT DOCUMENTS

CN    1541935 A    11/2004
CN    1632021 A    6/2005
(Continued)

OTHER PUBLICATIONS

Yue et al. (Polymeric Nanocomposites of Functionalized Carbon Nanotubes Synthesized in Supercritical CO2.) J of Nanosc and Nanotech, 7, pp. 994-1000, 2007).*

(Continued)

*Primary Examiner* — Tri V Nguyen
(74) *Attorney, Agent, or Firm* — The Webb Law Firm

(57) ABSTRACT

Provided area carbon nanotube composite material obtained by treating a mixture including carbon nanotubes, at least one carbon compound other than carbon nanotubes and a dispersion medium under a sub-critical or super-critical condition of 50-400 atm, and a method for producing the same. More particularly, the method for producing a carbon nanotube composite material, includes: introducing a mixture including carbon nanotubes, at least one carbon compound other than carbon nanotubes and a dispersion medium into a preheating unit under a pressure of 1-400 atm to (Continued)

preheat the mixture; treating the preheated mixture under a sub-critical or super-critical condition of 50-400 atm; cooling and depressurizing the resultant product to 0-1000 C and 1-10 atm; and recovering the cooled and depressurized product. Provided also is an apparatus for producing a carbon nanotube composite material in a continuous manner.

6 Claims, 4 Drawing Sheets

(51) Int. Cl.
B82Y 30/00 (2011.01)
C01B 31/02 (2006.01)
B82Y 40/00 (2011.01)

(58) Field of Classification Search
USPC .................. 252/500–511; 977/742, 778, 788
See application file for complete search history.

(56) References Cited

U.S. PATENT DOCUMENTS

| | | | |
|---|---|---|---|
| 2007/0265379 A1* | 11/2007 | Chen et al. | 524/404 |
| 2008/0220244 A1* | 9/2008 | Wai et al. | 428/328 |
| 2008/0293853 A1 | 11/2008 | Wolf et al. | |
| 2009/0200517 A1 | 8/2009 | El Bounia | |
| 2010/0044646 A1* | 2/2010 | Zhamu et al. | 252/511 |
| 2010/0078194 A1 | 4/2010 | Bhatt et al. | |
| 2010/0080748 A1 | 4/2010 | Han et al. | |
| 2010/0080978 A1* | 4/2010 | Jerome et al. | 428/317.9 |
| 2010/0213420 A1* | 8/2010 | Kamiya | B82Y 30/00 252/506 |

FOREIGN PATENT DOCUMENTS

| | | | | |
|---|---|---|---|---|
| CN | 101112982 A | * | 1/2008 | ............. C01B 31/02 |
| CN | 101112982 A | | 1/2008 | |
| CN | 101115791 A | | 1/2008 | |
| EP | 1052654 A1 | | 11/2000 | |
| EP | 1845124 A1 | | 10/2007 | |
| EP | 1623437 B1 | | 12/2007 | |
| EP | 2168915 A2 | | 3/2010 | |
| JP | 2003505332 A | | 2/2003 | |
| JP | 2004292231 A | | 10/2004 | |
| JP | 2004331777 A | * | 11/2004 | ............. C08L 87/00 |
| JP | 2005263607 A | | 9/2005 | |
| JP | 20068945 A | | 1/2006 | |
| JP | 200645034 A | | 2/2006 | |
| JP | 200722896 A | | 2/2007 | |
| JP | 2008169402 A | | 7/2008 | |
| JP | 2008539295 A | | 11/2008 | |
| JP | 2009521535 A | | 6/2009 | |
| KR | 1020060052657 A | | 5/2006 | |
| KR | 100706652 B1 | | 4/2007 | |
| KR | 1020080053924 A | | 6/2008 | |
| KR | 1020080062448 A | | 7/2008 | |
| TW | 200829605 A | | 7/2008 | |
| WO | 0107694 A1 | | 2/2001 | |
| WO | 2008041965 A2 | | 4/2008 | |
| WO | 2009003357 A1 | | 1/2009 | |
| WO | WO 2009035163 A1 | * | 3/2009 | ............. C08L 87/00 |

OTHER PUBLICATIONS

Yue ("Polymeric Nanocomposites of Functionalized Carbon Nanotubes Synthesized in Supercritical CO2." J of Nanosc Nanotech, 7(3), pp. 994-1000, 2007).*

* cited by examiner

Example 1

Comparative Example 1

BLENDING IMPROVEMENT CARBON-COMPOSITE HAVING CARBON-NANOTUBE AND ITS CONTINUOUS MANUFACTURING METHOD AND APPARATUS

TECHNICAL FIELD

The present invention relates to a carbon nanotube composite material and a method for producing the same, and more particularly, to a carbon nanotube composite material obtained by treating a mixture including carbon nanotubes, at least one carbon compound other than carbon nanotubes and a dispersion medium under a sub-critical or super-critical condition to increase intermiscibility, and a method for continuously producing the same.

BACKGROUND ART

Since the structure of carbon nanotubes (CNTs) was found in 1991 for the first time, intensive studies about the synthesis, physical properties and application of CNTs have been conducted. In addition, it was found that CNTs are produced upon the addition of a transition metal, such as Fe, Ni or Co, during electric discharge. Since a substantial amount of samples was made by laser evaporation in 1996, studies of CNTs have been raging. Such CNTs have a hollow tube-like shape wound spherically at a graphite surface with a nano-scaled diameter. Herein, depending on the angle and structure of such winding of the graphite surface, CNTs are characterized electrically as conductors or semiconductors. Further, CNTs are classified, depending on the number of graphite walls, into single-walled carbon nanotubes (SW-CNTs), double-walled carbon nanotubes (DWCNTs), thin multi-walled carbon nanotubes, multi-walled carbon nanotubes (MWCNTs) and roped carbon nanotubes.

In particular, CNTs have excellent mechanical strength and elasticity, are chemically stable and eco-friendly, and show electrically conductive or semiconductive properties. In addition, CNTs have a diameter of 1 nm to several tens nanometers and a length of several micrometers to several tens micrometers. Therefore, CNTs have an aspect ratio of about 1,000 and thus are larger than any known materials. Further, CNTs have a very large specific surface area, and thus have been spotlighted as an advanced material leading the $21^{st}$ century in the fields of next-generation information electronical materials, high-efficiency energy materials, highly functional composite materials and eco-friendly materials.

Such CNTs are used currently as conductive and reinforcing materials not only in polymers but also in other matrix materials, such as ceramic, metal, etc. Under these circumstances, active studies of CNTs for use in such applications have been made currently. Particularly, many attempts have been made to obtain highly conductive composite materials as high-added value materials by mixing CNTs with other materials in order to overcome the problems of high cost of original materials (CNTs) used alone and poor dispersibility thereof, when using CNTs as materials for improving certain physical properties, including conductivity, in matrix materials, such as polymers.

Korean Patent No. 706652 discloses an electrically conductive thermoplastic resin composition, including 80-99 parts by weight of a thermoplastic resin; 0.1-10 parts by weight of CNTs; and 0.1-10 parts by weight of organic nanoclay.

In addition, Korean Patent Laid-Open No. 2006-52657 discloses a composition, including: 99.6-10 parts by weight of a thermoplastic resin; 0-50 parts by weight of at least one rubber-elastomer; 0.2-10.0 parts by weight of carbon nanofibrils; 0.2-10.0 parts by weight of at least one microparticulate carbon compound, preferably carbon black or graphite powder; and 0-50 parts by weight of at least one filler and/or reinforcing agent.

However, the above compositions still have problems in that CNTs are not dispersed well in a matrix so that they realize maximized functions, and the intermiscibility of the resultant composite materials is too low to form electroconductive flow. Thus, to obtain a desired degree of conductivity, an undesirably large amount of CNTs and composite materials is used, resulting in degradation of the physical properties of the matrix.

DISCLOSURE OF INVENTION

Technical Problem

An object of the present invention is to provide a carbon nanotube composite material, which is obtained by treating a mixture including carbon nanotubes, at least one carbon compound other than carbon nanotubes and a dispersion medium under a sub-critical or super-critical condition to increase miscibility or dispersibility, and thus shows excellent dispersibility and conductivity in a matrix even in a small added amount, as well as to provide a method for producing the same.

Solution to Problem

In one general aspect, there are provided a carbon nanotube composite material obtained by treating a mixture including carbon nanotubes, at least one carbon compound other than carbon nanotubes and a dispersion medium under a sub-critical or super-critical condition of 50-400 atm, and a method and an apparatus for producing the same. The carbon nanotube composite material and the method for producing same disclosed herein include treatment under a sub-critical or super-critical condition to increase intermiscibility and binding force. Therefore, it is possible to provide a carbon nanotube composite material having excellent dispersibility and improved conductivity.

More particularly, the mixture has improved intermiscibility and dispersibility through the treatment under a sub-critical or super-critical condition. In addition, when the treatment further includes an oxidant, the oxidant may infiltrate uniformly into the particles of the mixture to allow surface oxidation at a uniform concentration. Further, the sub-critical or super-critical treatment in the presence of an oxidant improves the infiltration ability of the oxidant, so that oxidation may proceed more uniformly and promptly. Therefore, the carbon nanotube composite material disclosed herein may provide further improved interbinding force and miscibility by virtue of the oxidation. The carbon nanotube composite material having improved intermiscibility is advantageous in that it shows excellent conductivity and dispersibility in a matrix such as polymer even when added in a small amount. Hereinafter, the carbon nanotube composite material will be explained in more detail.

Advantageous Effects of Invention

The carbon nanotube composite material and the method for producing the same disclosed herein include treatment under a sub-critical or super-critical condition to increase intermiscibility, dispersibility and binding force. Therefore, it is possible to provide a carbon nanotube composite material having excellent dispersibility and improved conductivity. In addition, the carbon nanotube composite material is obtained in a continuous manner through an apparatus having easy handling characteristics and allowing easy wastewater treatment, further using a non-harmful oxidant. Therefore, it is possible to further improve intermiscibility, dispersibility and binding force.

The carbon nanotube composite material disclosed herein may show higher dispersibility and organic binding force in various types of solvents and polymer matrices, as compared to other materials. As a result, it is possible to improve various physical properties, including electroconductivity, thermal conductivity, strength, wear resistance, impact resistance, elasticity and foamability.

Further, the resin composition including the carbon nanotube composite material obtained by the method disclosed herein may be used in at least one material selected from the group consisting of conductive coating agents, static dissipating materials, static dissipating coating agents, conductive materials, electromagnetic wave shielding materials, electromagnetic wave absorbing materials, electromagnetic wave shielding coating agents, electromagnetic wave absorbing coating agents, solar cell materials, electrode materials for dye-sensitized solar cells (DSSCs), electric devices, electronic devices, semiconductor devices, optoelectric devices, notebook PC component materials, computer component materials, cellular phone component materials, personal digital assistant (PDA) component materials, component materials for game machines, housing materials, transparent electrode materials, opaque electrode materials, field emission display (FED) materials, backlight unit (BLU) materials, liquid crystal display (LCD) materials, plasma display panel (PDP) materials, light emitting diode (LED) materials, touch panel materials, electronic display materials, billboard materials, display materials, heat emitting bodies, heat radiating bodies, plating materials, catalysts, cocatalysts, oxidizing agents, reducing agents, materials for car parts, materials for ship parts, materials for airplane parts, electronic envelope materials, protective tape materials, adhesive materials, tray materials, clean room materials, materials for transport machine parts, flame retardant materials, antibacterial materials, metal composite materials, non-ferrous metal composite materials, medical materials, building materials, flooring materials, wallpaper materials, light source component materials, lamp materials, optical materials, fiber materials, clothing materials, electric materials and electronic materials.

BRIEF DESCRIPTION OF DRAWINGS

The above and other objects, features and advantages of the present invention will become apparent from the following description of preferred embodiments given in conjunction with the accompanying drawings, in which.

DETAILED DESCRIPTION OF MAIN ELEMENTS

Figure 1:
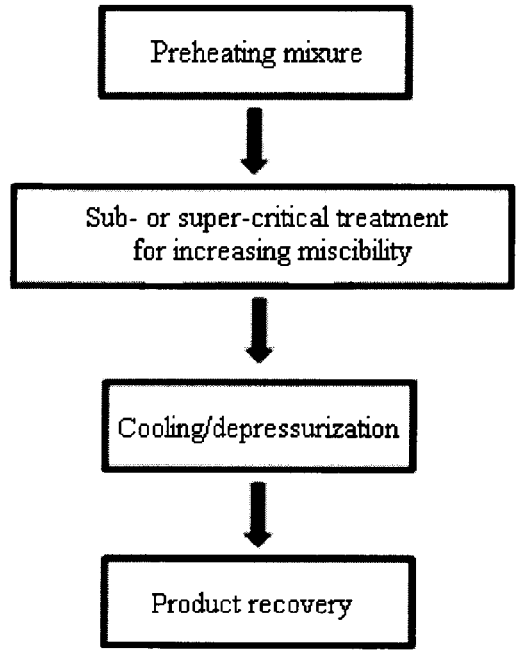
FIG. 1 is a flow chart of the method for producing a carbon nanotube composite material according to the present invention

10: mixing unit
11: circulation pump
12: high-pressure pump for mixture
13: high-pressure pump for injection of oxidant
14: heat exchanger
15: cooler
16: pressure controller
110: preheating unit
130: reaction unit
150: cooling/depressurization unit
170: storage unit
210, 230: filtration unit
211, 231: filtrate
213, 233: filtered product after sub-critical or super-critical treatment and filtration
300: filtrate storage unit

BEST MODE FOR CARRYING OUT THE INVENTION

Hereinafter, the embodiments of the present invention will be described in detail with reference to accompanying drawings.

In the carbon nanotube composite material disclosed herein, the carbon compound may be selected from the group consisting of graphite, carbon fibers, carbon black, graphene, fullerene and a combination thereof. Further, the carbon nanotubes may be selected from the group consisting of single-walled carbon nanotubes, double-walled carbon nanotubes, thin multi-walled carbon nanotubes, multi-walled carbon nanotubes, roped carbon nanotubes and combinations thereof. The carbon nanotubes and the carbon compound may be used in a weight ratio of 1:0.00001-1:100 to increase miscibility effectively, but are not limited thereto.

The dispersion medium may be selected from the group consisting of water, aliphatic alcohols, carbon dioxide and a combination thereof.

The carbon nanotube composite material disclosed herein is provided with increased miscibility, and thus has decreased surface resistance and satisfies Formula 1:

$$1\times10^2 \Omega/\square \leq R_p \leq 1\times10^8 \Omega/\square \quad \text{[Formula 1]}$$

In Formula 1, $R_p$ is the surface resistance of a polyethylene resin containing 4 wt % of the carbon nanotube composite material.

The mixture is treated under a sub-critical or super-critical condition further using an oxidant. The oxidant may be selected from oxygen, air, ozone, hydrogen peroxide and a mixture thereof. The oxidant may be used in an amount of 0.00001-30 parts by weight based on 100 parts by weight of the carbon nanotubes and the carbon compound.

Hereinafter, the method for producing the carbon nanotube composite material disclosed herein will be explained in more detail with reference to the accompanying drawings.

In one aspect, there is provided a method for producing a carbon nanotube composite material, including treating a mixture including carbon nanotubes, at least one carbon compound other than carbon nanotubes and a dispersion medium under a sub-critical or super-critical condition of 50-400 atm.

More particularly, there is provided a method for producing a carbon nanotube composite material, including:

introducing a mixture including carbon nanotubes, at least one carbon compound other than carbon nanotubes and a dispersion medium into a preheating unit under a pressure of 1-400 atm to preheat the mixture;

treating the preheated mixture under a sub-critical or super-critical condition of 50-400 atm;

cooling and depressurizing the resultant product to 0-100° C. and 1-10 atm; and recovering the cooled and depressurized product.

The mixture may be treated under the sub-critical or super-critical condition further using an oxidant. The oxidant may be selected from oxygen, air, ozone, hydrogen peroxide and a mixture thereof. The oxidant may be used in an amount of 0.00001-30 parts by weight based on 100 parts by weight of the carbon nanotubes and the carbon compound. More detailed description of the oxidant and the dispersion medium is provided hereinbefore, and thus will be omitted hereinafter.

In another aspect, there is provided an apparatus for increasing intermiscibility or dispersibility of a mixture in a continuous manner, including:

a preheating unit into which a mixture including carbon nanotubes, at least one carbon compound other than carbon nanotubes and a dispersion medium is introduced under a pressure of 1-400 atm;

a reaction unit treating the mixture passed from the preheating unit under a sub-critical or super-critical condition of 50-400 atm to increase miscibility;

a cooling/depressurization unit cooling and depressurizing the mixture passed from the reaction unit to 0-100° C. and 1-10 atm; and a product storage unit recovering the product passed from the cooling/depressurization unit.

Hereinafter, a preferred embodiment of the present invention will be described in detail. For the purposes of clarity and simplicity, a detailed description of known functions and configurations incorporated herein will be omitted as it may make the subject matter of the present invention unclear.

As used herein, the terms "about", "substantially", or any other version thereof, are defined as being close to the value as mentioned, when a unique manufacturing and material tolerance is specified. Such terms are used to prevent any unscrupulous invader from unduly using the disclosure of the present invention including an accurate or absolute value described to assist the understanding of the present invention.

Figure 2:
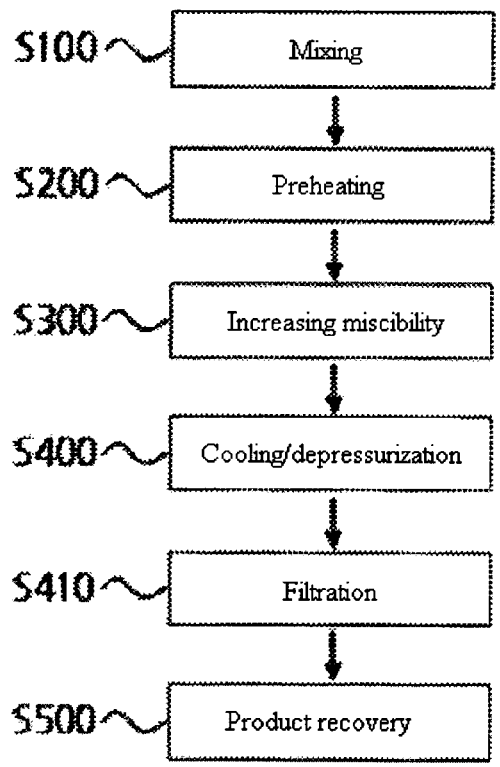
FIG. 2 is a flow chart of the method for producing a carbon nanotube composite material in accordance with an exemplary embodiment of the present invention

FIG. 1 is a flow chart of the method for producing a carbon nanotube composite material according to the present invention. FIG. 2 is a more specific flow chart of the method for producing a carbon nanotube composite material in accordance with an exemplary embodiment of the present invention. Referring to FIG. 2, the method for producing a carbon nanotube composite material includes: a mixing operation S100; a preheating operation S200; an operation S300 of increasing miscibility; a cooling/depressurization operation S400; and a product recovery operation S500. The method may further include a filtering operation S410 after the cooling/depressurization operation.

Figure 3:
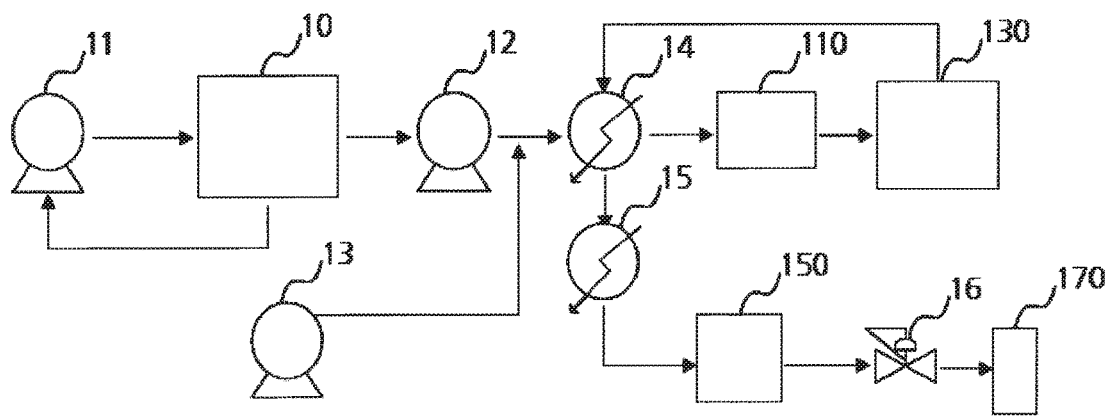
FIG. 3 is a schematic view showing the apparatus for the continuous production of a carbon nanotube composite material in accordance with an exemplary embodiment of the present invention

FIG. 3 is a schematic view showing the apparatus for the continuous production of a carbon nanotube composite material in accordance with an exemplary embodiment of the present invention. Referring to FIG. 3, the apparatus includes a mixing unit 10, a preheating unit 110, a reaction unit 130 for increasing miscibility, a cooling/depressurization unit 150, and a product storage unit 170.

Before the mixture including carbon nanotubes, at least one carbon compound other than carbon nanotubes and a dispersion medium is introduced into the preheating unit 110, it is introduced into the mixing unit 10 so that it is provided as a mixture by a circulation pump 11 in the mixing operation S100. The mixture may include carbon nanotubes and at least one carbon compound other than carbon nanotubes in an amount of 0.0001-30 wt %, preferably 0.001-5 wt %.

When the carbon nanotubes and the carbon compound are present in the total mixture in an amount less than 0.0001 wt %, the amount of the recovered product is too low. On the other hand, when the carbon nanotubes and the carbon compound are present in an amount of more than 30 wt %, the mixture has increased viscosity making it difficult to introduce it under high pressure.

The preheating operation S200 is carried out in the preheating unit 110, and the mixture is introduced under a pressure of 1-400 atm to perform the preheating.

While the mixture is introduced into the preheating unit 110 through a high-pressure pump 12 under a pressure of 1-400 atm, an oxidant may be further introduced thereto through a high-pressure injection pump 13 under a pressure of 1-400 atm. The mixture is in contact with the oxidant, the mixture is further combined with the oxidant at the front end of a heat exchanger 14, and the resultant mixture is introduced into the preheating unit 110 in which it is preheated to 50-370° C. When the mixture and the oxidant are introduced through the high-pressure pump, a pressure less than 1 atm makes it difficult to introduce the mixture and the oxidant into the preheating unit 110 and the reaction unit 130. On the other hand, a pressure higher than 400 atm causes energy loss and does not provide any further improvement in reactivity during the sub-critical or super-critical treatment.

The preheating unit 110 is intended to maintain the reaction unit 130 at a constant temperature by preheating the mixture before treated under the sub-critical or super-critical condition as described hereinafter. Therefore, the heat exchanger 14 installed at the front end of the preheating unit 110 serves to preheat the mixture and the oxidant and to decrease the temperature of the product treated under the sub-critical or super-critical condition preliminarily before the cooling operation, thereby preventing loss in energy consumed during the subsequent cooling. When the temperature of the preheating unit is lower than 50° C., more increased temperature is required during the sub-critical or super-critical treatment, and thus it is not possible to prevent undesired energy loss. When the temperature of the preheating unit is higher than 370° C., energy consumption needed to increase the temperature exceeds the benefit of preheating, and thus it is not possible to obtain any desired effect from the heat exchanger. After the preheating operation S200, the mixture is subjected to operation S300 of increasing miscibility. This operation means treatment under a sub-critical or super-critical condition. The mixture and the oxidant preheated in the preheating unit 110 are transferred to the reaction unit 130, in which it may be treated under a sub-critical or super-critical condition of 50-400 atm.

There is no particular limitation in the temperature of the reaction unit 130. Preferably, the temperature of the reaction unit 130 is 50-60° C. More particularly, the sub-critical treatment is carried out preferably at a temperature of 50-380° C., more preferably 100-350° C. The sub-critical treatment is carried out preferably under a pressure of 50-260 atm, more preferably 60-260 atm. In this case, the treatment is carried out preferably for 0.1-60 minutes, more preferably 1-20 minutes.

Meanwhile, the super-critical treatment is carried out preferably under a pressure of 150-400 atm, more preferably 210-300 atm. The super-critical treatment is carried out preferably at a temperature of 350-600° C., more preferably 370-500° C. In this case, the treatment is carried out preferably for 0.1-60 minutes, more preferably 1-15 minutes.

After the sub-critical or super-critical treatment in the reaction unit 130, the resultant product may be cooled preliminarily to 100-370° C. through the heat exchanger 14. Such preliminary cooling is based on the temperature of the mixture and the oxidant introduced and preheated continuously. In addition, the mixture and the oxidant introduced continuously may be preheated by the product treated in the reaction unit 130. In this manner, it is possible to prevent energy loss.

The product obtained after the sub-critical or super-critical treatment may be further subjected to the cooling/depressurization operation S400 so that it is cooled and depressurized to 0-100° C. and 1-10 atm. The product cooled preliminarily by the heat exchanger 14 may be further cooled through the cooler 15. The cooling temperature may be controlled to 20-50° C.

The cooled product is depressurized first in the cooling/depressurization unit 150 to 10-100 atm by a capillary depressurizer while maintaining the product in a cooled state, and then cooled finally to 1-10 atm by a pressure controller 16:

The product passed from the cooling/depressurization unit may be finally recovered in the product storage unit 170 in operation S500. The product may be used in a liquid state or powdery state. To obtain such a powdery product, the method may further include a filtration operation S410 of filtering the product under high pressure, after the cooling/depressurization operation.

Figure 4:
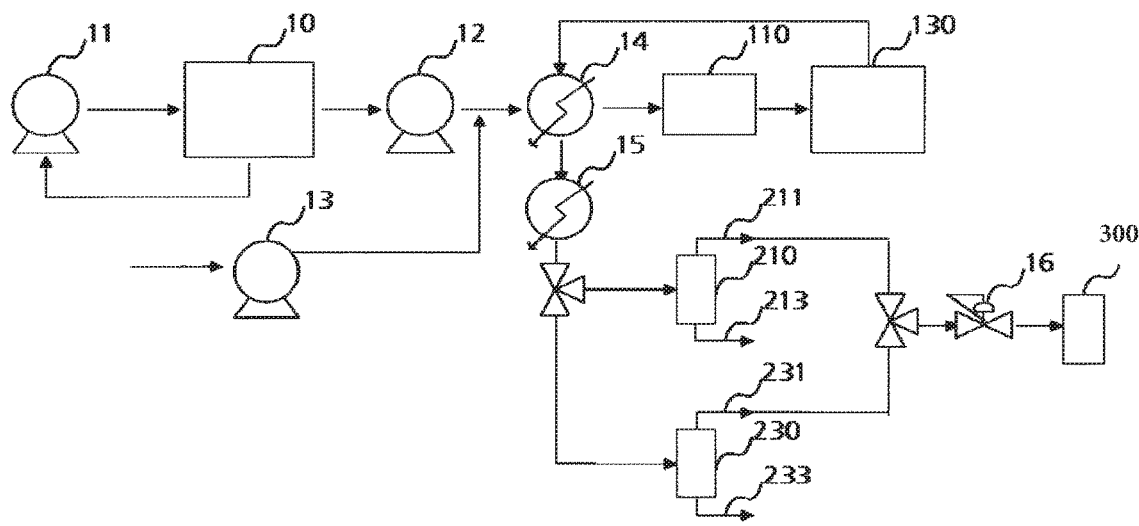
FIG. 4 is a schematic view showing the apparatus for continuous production of a carbon nanotube composite material including a filtration unit in accordance with an exemplary embodiment of the present invention

FIG. 4 is a schematic view showing the apparatus for continuous production of a carbon nanotube composite material including a filtration unit in accordance with an exemplary embodiment of the present invention. To filter the product after the sub-critical or super-critical treatment and cooling operations, the apparatus further includes filtration units 210, 230 operated by high-pressure filters, each having pores with a size of 0.001-10 μm, connected in parallel with each other and driven in a switching mode. The product is discharged after separated into the filtrates 211, 231 and the filtered products 213, 233 by the filtration units 210, 230. The filtrates 211, 231 are depressurized by the pressure controller 16 to ambient pressure, and then are transferred to and treated in a filtrate storage unit 300. One or more filtration units 210, 230 may be installed in parallel depending on the desired capacity.

More particularly, when the product is separated into the filtrates and the filtered products with improved miscibility in the filtration units 210, 230, the cooled product is filtered by closing the valve upon the application of pressure to the filtration unit 210 and opening the filtration unit 230, while the filtered product 213 in the filtration unit 210 is recovered and the filtrate 211 is transferred to and treated in the filtrate storage unit 300.

In the same manner, upon the application of pressure to the filtration unit 230, the valve is closed and the filtration unit 210 is opened to filter the cooled product continuously. The filtered product 233 in the filtration unit 230 is recovered, and the filtrate 231 is transferred to and treated in the filtrate storage unit 300. The above procedure is repeated in a switching mode by applying the filtration units alternately so as to produce the carbon nanotube composite material continuously and to further increase miscibility.

In still another aspect, there is provided a resin composition including the carbon nanotube composite material disclosed herein and a thermoplastic resin The resin composition may further include a foaming agent. There is no particular limitation in the foaming agent. However, the foaming agent may be selected from the group consisting of azodicarboxylamide, azobistetrazole diaminoguanidine, azobistetrazole guanidine, 5-phenyltetrazole, bistetrazole guanidine, bistetrazole piperazine, bistetrazole diammonium, N,N-dinitrosopentamethylene tetramine, hydrazodicarboxyl amide and a combination thereof.

Particular examples of the thermoplastic resin that may be used in the present invention include a resin selected from the group consisting of polyethylene resins, polyacetal resins, polyacrylate resins, polycarbonate resins, polystyrene resins, polyester resins, polyvinyl resins, polyphenylene ether resins, polyolefin resins, polyacrylonitrile-butadiene-styrene copolymer resins, polyarylate resins, polyamide resins, polyamideimide resins, polyarylsulfone resins, polyetherimide resins, polyethersulfone resins, polyphenylene sulfide resins, polyfluororesins, polyimide resins, polyether ketone resins, polybenzoxazole resins, polyoxadiazoleresins, polybenzothiazole resins, polybenzimidazole resins, polypyridine resins, polytriazole resins, polypyrrolidine resins, polydibenzofuran resins, polysulfone resins, polyurea resins, polyphosphazene resins, and a blend thereof.

Further, the resin composition including the carbon nanotube composite material obtained by the method disclosed herein may be used in at least one material selected from the group consisting of conductive coating agents, static dissipating materials, static dissipating coating agents, conductive materials, electromagnetic wave shielding materials, electromagnetic wave absorbing materials, electromagnetic wave shielding coating agents, electromagnetic wave absorbing coating agents, solar cell materials, electrode materials for dye-sensitized solar cells (DSSCs), electric devices, electronic devices, semiconductor devices, optoelectric devices, notebook PC component materials, computer component materials, cellular phone component materials, personal digital assistant (PDA) component materials, component materials for game machines, housing materials, transparent electrode materials, opaque electrode materials, field emission display (FED) materials, backlight unit (BLU) materials, liquid crystal display (LCD) materials, plasma display panel (PDP) materials, light emitting diode (LED) materials, touch panel materials, electronic display materials, billboard materials, display materials, heat emitting bodies, heat radiating bodies, plating materials, catalysts, cocatalysts, oxidizing agents, reducing agents, materials for car parts, materials for ship parts, materials for airplane parts, electronic envelope materials, protective tape materials, adhesive materials, tray materials, clean room materials, materials for transport machine parts, flame retardant materials, antibacterial materials, metal composite materials, non-ferrous metal composite materials, medical materials, building materials, flooring materials, wallpaper materials, light source component materials, lamp materials, optical materials, fiber materials, clothing materials, electric materials and electronic materials.

Mode for the Invention

The examples and experiments will now be described. The following examples and experiments are for illustrative purposes only and not intended to limit the scope of the present invention.

EXAMPLE 1

First, 10 g of multi-walled carbon nanotubes (Hanwha Nanotec Co., MWCNT) and 10 g of carbon black (Cabot Co., USA) are mixed with 980 g of distilled water through a circulation pump 11 to provide a mixture in a mixing unit 10. The mixture is introduced into a preheating unit 110 through a high-pressure injection pump 12 at a flow rate of 15 g/min. The resultant solution is passed through a heat exchanger 14 to the preheating unit 110 heated to 200-240° C.

Next, the preheated mixture is introduced into a reaction unit 130 to increase miscibility under sub-critical water at 300° C. and 230 atm to 250 atm, and then subjected to the sub-critical treatment. The resultant product having improved intermiscibility is transferred back to the heat exchanger 14, cooled preliminarily therein to 200° C., and then further cooled to about 25° C. through a cooler 15. In this manner, 19.9 g of a carbon nanotube composite material having improved intermiscibility is obtained in a continuous manner.

EXAMPLE 2

Example 1 is repeated, except that the temperature of the heat exchanger 14 is 350-370° C. during the preheating of the carbon nanotube composite material including the multi-walled carbon nanotubes and the carbon black, and the mixture is treated under super-critical water at a temperature of 400° C. to increase intermiscibility. In this manner, 19.7 g of a carbon nanotube composite material is obtained as a product.

EXAMPLE 3

Example 1 is repeated, except that the mixture of the multi-walled carbon nanotubes and the carbon black is further mixed with oxygen introduced to the front end of the heat exchanger 14 at a flow rate of 0.04 g/min in a vapor phase pressurized to 245-252 atm, before the mixture is introduced into the preheating unit 110. In this manner, 19.2 g of a carbon nanotube composite material is obtained as a product.

EXAMPLE 4

Example 1 is repeated, except that carbon fibers (Toray Co., Japan) are used instead of carbon black to obtain 19.9 g of a carbon nanotube composite material having improved intermiscibility as a product.

EXAMPLE 5

First, 960 g of low-density polyethylene (LDPE 830; HCC) and 40 g of the carbon nanotube composite material obtained from Example 1 are introduced to the hopper of a rotating twin screw extruder. Next, the polymer resin is molten by the rotation of the extruder screws at 200° C. and kneaded with the carbon nanotube composite material. Then, the resultant resin composition is extruded through an extrusion die continuously. The polyethylene strands emitted from the extruder are passed through a pelletizer to be formed into small pellets, which, in turn, is subjected to pressing to provide a sheet with a thickness of 2 mm.

EXAMPLE 6

Example 5 is repeated except that 40 g of the carbon nanotube composite material obtained from Example 3 is used.

EXAMPLE 7

Example 5 is repeated except that 40 g of the carbon nanotube composite material obtained from Example 4 is used.

COMPARATIVE EXAMPLE 1

Example 5 is repeated, except that the mixture containing multi-walled carbon nanotubes (Hanwha Nanotec Co., MWCNT) and carbon black (Cabot Co., USA) at a ratio of 1:1 is dispersed using an electric mixer (SHINIL Co., ELECTRIC MIXER, SFM-1500NM) for 1 minute and introduced directly into the hopper.

COMPARATIVE EXAMPLE 2

Example 5 is repeated, except that the crude sample of the composite carbon material, containing multi-walled carbon nanotubes (Hanwha Nanotec Co., MWCNT) and carbon fibers (Toray Co., Japan) at a ratio of 1:1 is dispersed using an electric mixer (SHINIL Co., ELECTRIC MIXER, SFM-1500NM) for 1 minute and introduced directly into the hopper.

TEST EXAMPLE

Scanning Electron Microscopy (SEM) Determination

A scanning electron microscope available from Hitachi Co. as the model name of S4800 is used. The carbon nanotube composite materials obtained from Example 1 and Comparative Example 1 are dispersed individually in water, and each sample is dropped on glass, dried completely and plated with platinum, before the SEM determination.

Figure 5:
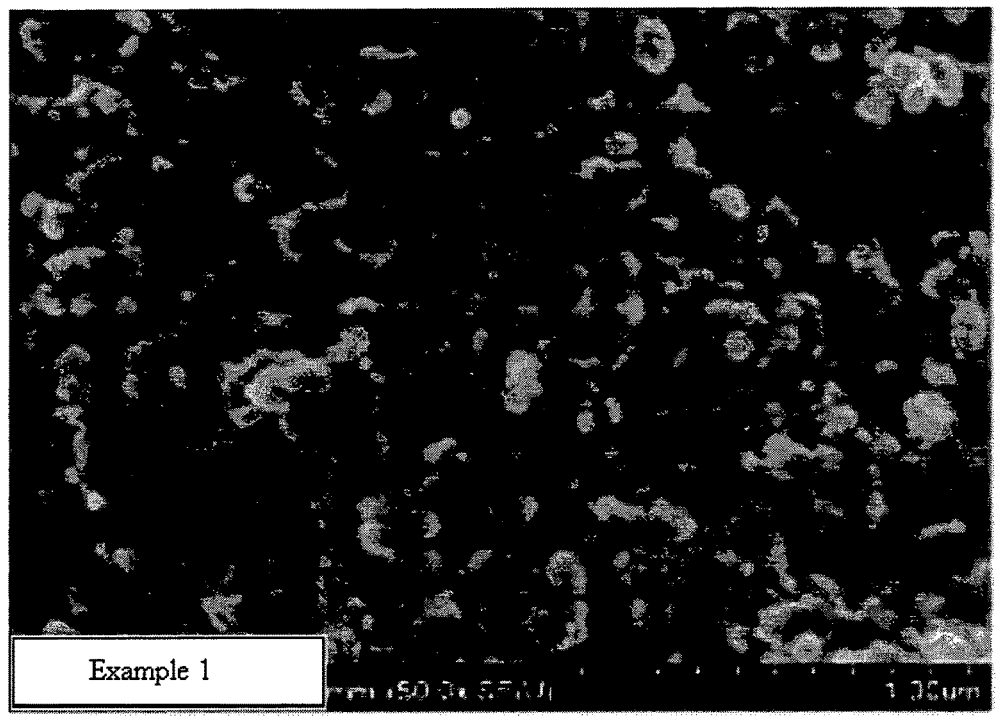
FIG. 5 is a photographic view of the carbon nanotube composite material obtained from Example 1, taken by scanning electron microscopy (SEM)
Figure 6:
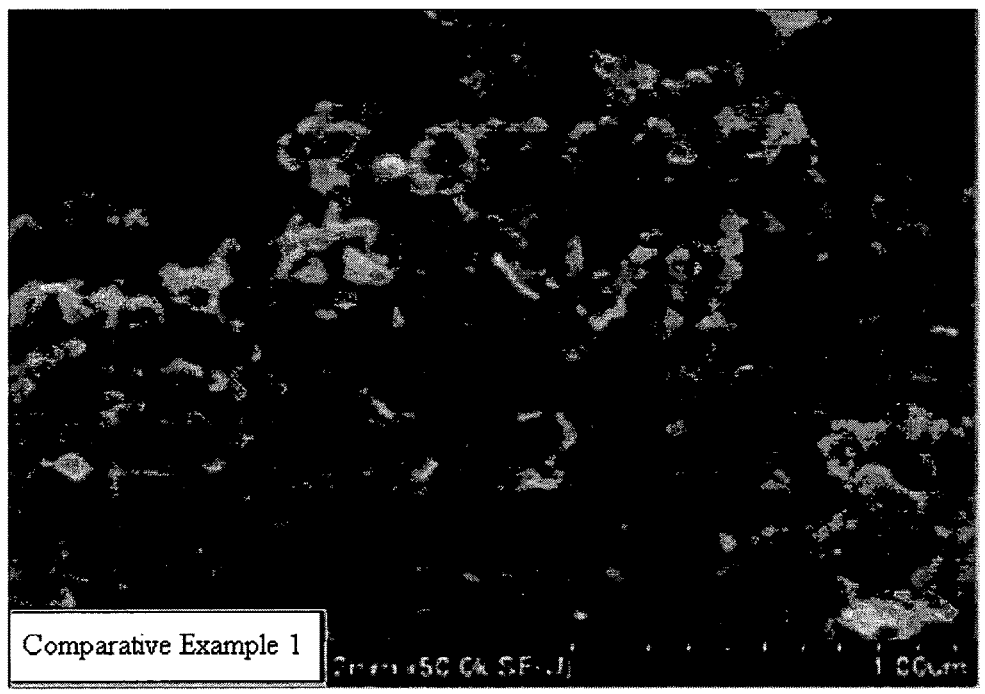
FIG. 6 is a photographic view of the mixture of multi-walled carbon nanotubes with carbon black according to Comparative Example 1, taken by SEM

FIG. 5 is a photographic view of the carbon nanotube composite material obtained from Example 1, taken by SEM. It can be seen that the carbon nanotube composite material obtained from Example 1 having improved miscibility through the sub-critical treatment includes the multi-walled carbon nanotubes and carbon black dispersed uniformly therein. FIG. 6 is an SEM photographic view of the mixture of multi-walled carbon nanotubes with carbon black, dispersed for 1 minute by an electric mixer (SHINIL Co., ELECTRIC MIXER, SFM-1500NM) according to Comparative Example 1. Unlike the result as shown in FIG.

5, it can be seen from FIG. 6 that the multi-walled carbon nanotubes are not compatible with carbon black but most of them are present independently from carbon black.

Transmission Electron Microscopy (TEM) Determination

Figure 7:
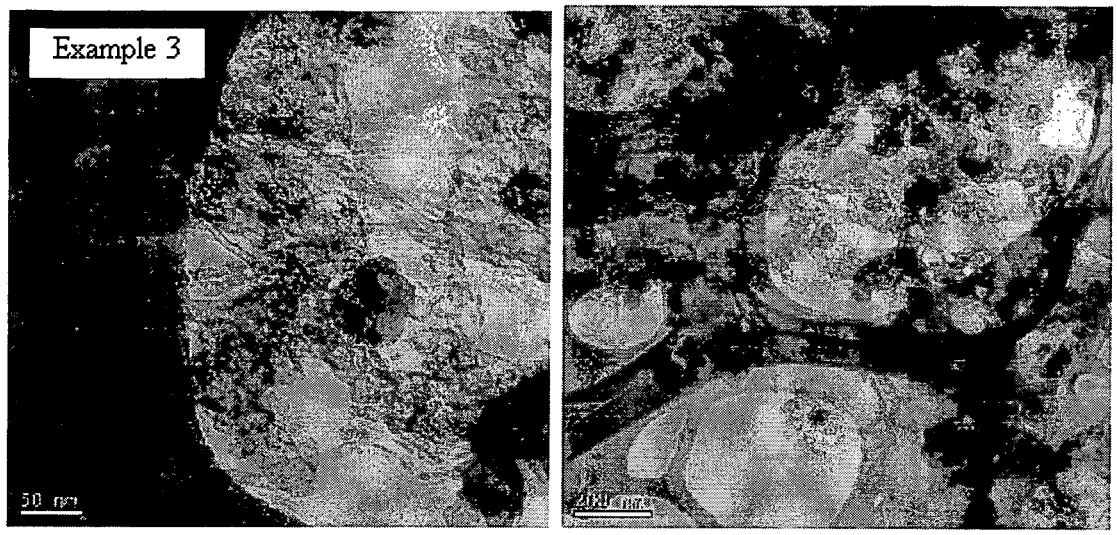
FIG. 7 is a photographic view of the carbon nanotube composite material obtained from Example 3, taken by transmission electron microscopy (TEM)
Figure 8:
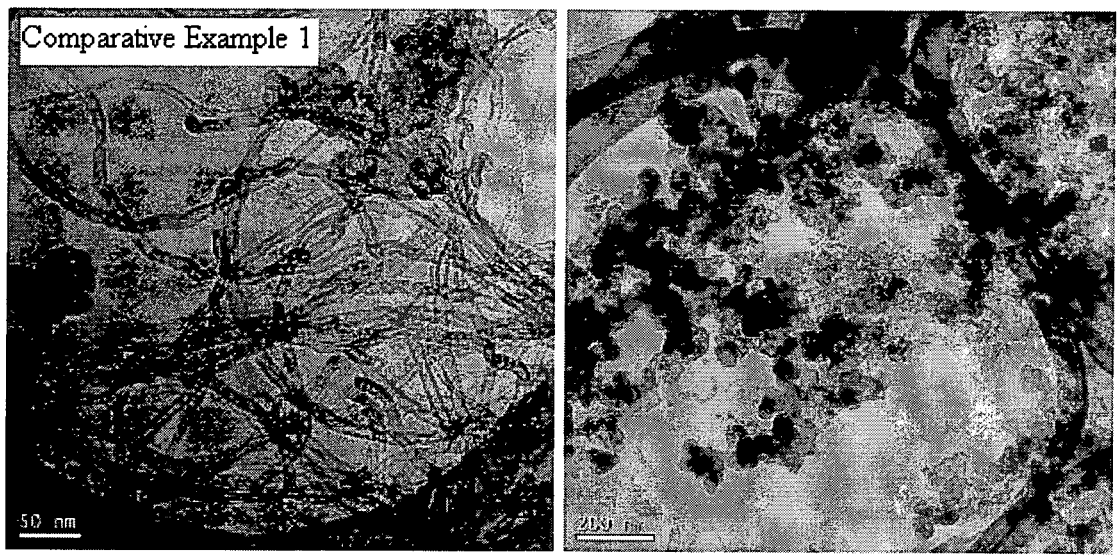
FIG. 8 is a photographic view of the mixture of multi-walled carbon nanotubes with carbon black according to Comparative Example 1, taken by TEM.

A transmission electron microscope available from JEOL Co. in the model name of JEM-2100F (HR) is used and the sample is determined on a holic-type grid. FIG. 7 is a photographic view of the carbon nanotube composite material obtained from Example 3, taken by TEM. It can be seen that the carbon nanotube composite material obtained from Example 3 having improved miscibility through the sub-critical and oxidation treatment includes the multi-walled carbon nanotubes and carbon black dispersed uniformly therein. FIG. 8 is a TEM photographic view of the mixture of multi-walled carbon nanotubes with carbon black, dispersed for 1 minute by an electric mixer (SHINIL Co., ELECTRIC MIXER, SFM-1500NM) according to Comparative Example 1. Unlike the result as shown in FIG. 7, it can be seen from FIG. 8 that the two carbon materials are not compatible but most of them are present independently from each other.

Measurement of Surface Resistance

The surface resistance of each of Examples 5, 6 and 7 and Comparative Examples 1 and 2 is measured by using Loresta GP (MCP-T600) available from Mitsubishi Co. according to JIG K 7194/ASTM D991. The results are shown in Table 1.

As shown in Table 1, the polyethylene sheets containing the composite carbon materials having improved miscibility (Examples 5, 6 and 7) show lower surface resistance than the polyethylene sheets using the composite carbon materials of Comparative Examples 1 and 2.

TABLE 1

| | Poly-ethylene (g) | Ex. 1 (g) | Ex. 3 (g) | Ex. 4 (g) | Mixture of multi-walled carbon nanotubes with carbon black (g) | Mixture of multi-walled carbon nanotubes with carbon fibers (g) | Surface resistance ($\Omega/\square$) |
|---|---|---|---|---|---|---|---|
| Ex. 5 | 960 | 40 | — | — | — | — | $4.2 \times 10^2$ |
| Ex. 6 | 960 | — | 40 | — | — | — | $9.6 \times 10^2$ |
| Ex. 7 | 960 | — | — | 40 | — | — | $5.5 \times 10^4$ |
| Comp. Ex. 1 | 960 | — | — | — | 40 | — | $5.9 \times 10^7$ |
| Comp. Ex. 2 | 960 | — | — | — | — | 40 | $8.2 \times 10^9$ |

The invention claimed is:

1. A carbon nanotube composite material obtained by treating a mixture comprising carbon nanotubes, at least one carbon compound other than carbon nanotubes, a dispersion medium, and an oxidant selected from the group consisting of oxygen, air, ozone, hydrogen peroxide, and mixtures thereof under a sub-critical condition of 50-400 atm.

2. The carbon nanotube composite material according to claim 1, wherein the carbon compound is selected from the group consisting of graphite, carbon fibers, carbon black, graphene, fullerene and a combination thereof.

3. The carbon nanotube composite material according to claim 1, wherein the carbon nanotubes are selected from the group consisting of single-walled carbon nanotubes, double-walled carbon nanotubes, thin multi-walled carbon nanotubes, multi-walled carbon nanotubes, roped carbon nanotubes and combinations thereof.

4. The carbon nanotube composite material according to claim 1, wherein the dispersion medium is selected from the group consisting of water, aliphatic alcohols, carbon dioxide and a mixture thereof.

5. The carbon nanotube composite material according to claim 1, which satisfies Formula 1:

$$1 \times 10^2 \Omega/\square \leq R_p \leq 1 \times 10^8 \Omega/\square \qquad \text{[Formula 1]}$$

wherein, $R_p$ is the surface resistance of a polyethylene resin containing 4 wt % of the carbon nanotube composite material.

6. The carbon nanotube composite material according to claim 1, wherein the carbon nanotubes and the carbon compound are used in a weight ratio of 1:0.00001-1:100.

* * * * *